United States Patent Office 3,033,835
Patented May 8, 1962

3,033,835
CURING ENDOCYCLIC RING CONTAINING HYDROCARBON POLYMERS WITH SULFUR AND PEROXIDE
Stephen Adamek and Arthur Durwin Dingle, Toronto, Ontario, Canada, assignors to Dunlop Rubber Company Limited, London, England, a British company
No Drawing. Filed Mar. 28, 1960, Ser. No. 17,740
Claims priority, application Great Britain Apr. 1, 1959
12 Claims. (Cl. 260—79.5)

This invention relates to certain synthetic rubber-like polymers, and in particular to their vulcanisation.

In our application Ser. No. 748,165 there are described certain copolymers and especially terpolymers derived from one or more mono-olefines and an unsaturated bridged ring hydrocarbon which preferably contains two double bonds and has 7–10 carbon atoms in the molecule. A typical class of terpolymer of the type described is derived from two mono-olefines, especially ethylene and propylene, and a minor proportion, which can be quite small, of dicyclopentadiene. These terpolymers have the advantage over polymers and copolymers derived only from mono-olefines that they can be vulcanised with sulphur.

It has now been found that vulcanised products having even better physical properties than the said sulphur-cured polymers can be obtained by using as curing agents both sulphur and a peroxide curing agent, especially dicumyl peroxide. Moreover the physical properties of the products are better than when the peroxide curing agent is used in the absence of sulphur. These results were surprising, since in such systems as are already known in which both sulphur and a peroxide curing agent are used as the properties of the products fall between those of products obtained by the use of the two agents separately.

According to the invention, therefore, polymers obtained from one or more mono-olefines and an unsaturated bridged ring hydrocarbon are cured by a process in which both sulphur and a peroxide curing agent are used.

The mono-olefine components of the polymers preferably contain not more than 8 carbon atoms in the molecule and have the double bond in the α-position. Such mono-olefines are ethylene, propylene, butene-1, isobutene, pentenes, hexenes, heptenes and octenes with either linear or branched chains. Terpolymers in which the major proportion is made up of ethylene and propylene are of particular importance.

The bridged ring (or endocyclic) co-monomer must contain at least one double bond and can contain more, provided that it retains some of the properties of alicyclic hydrocarbons. The preferred compounds are the endocyclic hydrocarbons containing 7–10 carbon atoms and two double bonds, and in which also the bridge consists of one or two methylene groups. Substitution derivatives of these endocyclic hydrocarbons, such as the alkyl, aryl and cycloalkyl derivatives, can also be used.

Examples of suitable bridged ring hydrocarbons are:

(a) Unsaturated derivatives or bicyclo-(2,2,1)-heptane, including bicyclo-(2,2,1)-hepta-2-ene-(norbornene); bicyclo-(2,2,1)-hepta-2,5-diene; bicyclopentadiene (i.e. the hydrocarbon having the formula

and more correctly named 1,4-endomethylene-hydrind-2,6-diene); tricyclopentadiene and tetracyclopentadiene.

(b) Unsaturated derivatives of bicyclo-(2,2,2)-octane, including bicyclo-(2,2,2)-octa-2-ene and bicyclo-(2,2,2)-octa-2,5-diene.

(c) Unsaturated derivatives of bicyclo-(3,2,1)-octane.
(d) Unsaturated derivatives of bicyclo-(2,3,1)-nonane.
(e) Unsaturated derivatives of bicyclo-(3,2,2)-nonane.

The polymers can be made by the methods described in application Ser. No. 748,165.

The proportion of sulphur required for the vulcanisation is quite small and can, for example, be between 0.25 and 4%, especially 1–3%, of the weight of the polymer, though higher proportions can be used to obtain special effects. The sulphur is preferably used in association with one or more accelerators. While any of the known accelerators can be used, it has been found that the thiuram disulphide type, especially tetramethyl-thiuram disulphide, are particularly useful, and also that the addition of a small proportion of tellurium diethyl-dithiocarbamate or a similarly acting agent usually improves the properties of the product still further. The accelerators can be used in known proportions relative to the sulphur.

As the peroxide curing agent it is preferred to use dicumyl peroxide, but other peroxides can be used including diisopropyl peroxide, di-t-butyl peroxide and aromatic peroxides, such for example as dibenzoyl peroxide. The term "peroxide" is intended to include also hydroperoxides, e.g. cumyl and t-butyl hydroperoxides, and peresters, e.g. t-butyl perbenzoate, though these last compounds should not be used in combustions containing carbon black. The peroxide can be employed in association with a carrier; for example dicumyl peroxide can be absorbed on precipitated calcium carbonate, and di-t-butyl peroxide on a zeolite capable of acting as a molecular sieve with respect to it in the known way.

The proportion in which the peroxide is used will depend on its nature. With dicumyl peroxide proportions between 0.25 and 2%, and especially between 0.25 and 1%, of the weight of the polymer are very satisfactory. Other peroxides may require to be present in higher proportions to give the best effect.

The polymers are preferably cured at temperatures of about 300°–340° F., curing time of 20–80 minutes being generally satisfactory. As will be understood, the degree of cure obtained is higher, the higher the temperature and the longer the time employed. Generally speaking the presence of the peroxide curing agent has a greater effect at shorter curing times, e.g. when curing is effected for 20–45 minutes, than when extended curing times are employed.

The invention is illustrated by the following examples, in which the polymer employed is a terpolymer derived from 20 molecular proportions of ethylene, 100 molecular proportions of propylene, and one molecular proportion of dicyclopentadiene, the polymerisation being carried out to a conversion of 18.2% by weight of the total monomer charged.

Example I

A composition comprising 100 parts of the terpolymer, 50 parts of HAF black, 5.0 parts of zinc oxide, 2.0 parts of stearic acid, 1.0 part of dicumyl peroxide, 2.0 parts of sulphur, 1.0 part of tetramethyl-thiuram disulphide and 0.5 part of tellurium diethyl-dithiocarbamate was cured at 320° F. for 30 minutes. The properties of the product together with those of controls in which the dicumyl peroxide and the sulphur with the accelerators respectively had been omitted are shown in the following table:

| | Product | Control (dicumyl peroxide omitted) | Control (Sulphur omitted) |
|---|---|---|---|
| 300% Modulus p.s.i. | 1,255 | 1,160 | 500 |
| 500% Modulus p.s.i. | 2,510 | 2,240 | 1,040 |
| Tensile Strength p.s.i. | 2,940 | 2,480 | 1,690 |
| Elongation, percent | 550 | 540 | 750 |

A generally similar peroxide-sulphur cured product was obtained when the tellurium diethyl dithiocarbamate was omitted.

*Example II*

The same composition was cured at 320° F. for 60 minutes. The product had a tensile strength of 2920 p.s.i. and an elongation of 450%. If the dicumyl peroxide was omitted, the tensile strength was 2450 p.s.i. and the elongation 430%.

We claim:

1. Process for the production of cured synthetic rubber, which comprises heating a composition containing a copolymer of at least one mono-olefine, and an unsaturated hydrocarbon containing an endocyclic ring, 0.25-4% of sulphur, and 0.25-2% of an organic peroxide curing agent, both proportions being based on the weight of the copolymer.

2. Process for the production of cured synthetic rubber, which comprises heating a composition containing a copolymer of at least one mono-olefine, and an unsaturated hydrocarbon containing an endocyclic ring, 0.25-4% of sulphur, and 0.25-2% of dicumyl peroxide, both proportions being based on the weight of the copolymer.

3. Process for the production of cured synthetic rubber, which comprises heating a composition containing a copolymer of at least one mono-olefine, and an unsaturated hydrocarbon containing an endocyclic ring, 0.25-4% of sulphur together with a tetra-alkyl thiuram disulphide accelerator, and 0.25-2% of an organic peroxide curing agent, both proportions being based on the weight of the copolymer.

4. Process for the production of cured synthetic rubber, which comprises heating a composition containing a copolymer of at least one mono-olefine, and an unsaturated hydrocarbon containing an endocyclic ring, 0.25-4% of sulphur together with a tetra-alkyl thiuram disulphide accelerator, and tellurium diethyldithiocarbamate, and 0.25-2% of an organic peroxide curing agent, both proportions being based on the weight of the copolymer.

5. Process according to claim 1 wherein the said composition is heated to a temperature of 300°-340° F.

6. Process according to claim 1, wherein the hydrocarbon containing an endocyclic ring contains 2 ethylenic double bonds and has 7-10 carbon atoms in the molecule.

7. Process for the production of cured synthetic rubber, which comprises heating a composition containing a terpolymer of ethylene, propylene, and a minor proportion of dicyclopentadiene, 0.25-4% of sulphur, and 0.25-2% of an organic peroxide curing agent, both proportions being based on the weight of the copolymer.

8. Process for the production of cured synthetic rubber, which comprises heating a composition containing a terpolymer of ethylene, propylene, and a minor proportion of dicyclopentadiene, 0.25-4% of sulphur, and 0.25-2% of dicumyl peroxide, both proportions being based on the weight of the copolymer.

9. Process for the production of cured synthetic rubber, which comprises heating a composition containing a terpolymer of ethylene, propylene, and a minor proportion of dicyclopentadiene, 0.25-4% of sulphur together with a tetra-alkyl thiuram disulphide accelerator, and 0.25-2% of an organic peroxide curing agent, both proportions being based on the weight of the copolymer.

10. Process for the production of cured synthetic rubber, which comprises heating a composition containing a terpolymer of ethylene, propylene, and a minor proportion of dicyclopentadiene, 0.25-4% of sulphur together with a tetra-alkyl thiuram disulphide accelerator, and tellurium diethyldithiocarbamate, and 0.25-2% of an organic peroxide curing agent, both proportions being based on the weight of the copolymer.

11. Process for the production of cured synthetic rubber, which comprises heating a composition containing a terpolymer of ethylene, propylene, and a minor proportion of dicyclopentadiene, 1-3% of sulphur based on the weight of the terpolymer, tetramethyl thiuram disulphide as accelerator, and 0.25-1% of dicumyl peroxide based on the weight of the terpolymer.

12. Process for the production of cured synthetic rubber, which comprises heating to a temperature of 300°-340° F. a composition containing a terpolymer of ethylene, propylene, and a minor proportion of dicyclopentadiene, 1-3% of sulphur based on the weight of the terpolymer, tetramethyl thiuram disulphide as accelerator, and 0.25-1% of dicumyl peroxide based on the weight of the terpolymer.

References Cited in the file of this patent

UNITED STATES PATENTS

| 2,514,198 | Hansen et al. | July 4, 1950 |
| 2,643,247 | Fisher et al. | June 23, 1953 |
| 2,799,668 | Anderson et al. | July 16, 1957 |
| 2,809,372 | Frederick et al. | Oct. 8, 1957 |
| 2,883,372 | Stamatoff | Apr. 21, 1959 |
| 3,000,866 | Tarney | Sept. 19, 1961 |